United States Patent
Kim

(10) Patent No.: US 7,236,282 B2
(45) Date of Patent: Jun. 26, 2007

(54) POLYGON MIRROR AND OPTICAL SCANNING APPARATUS EMPLOYING THE SAME

(75) Inventor: Hyun-surk Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 123 days.

(21) Appl. No.: 11/106,458

(22) Filed: Apr. 15, 2005

(65) Prior Publication Data

US 2005/0231780 A1    Oct. 20, 2005

(30) Foreign Application Priority Data

Apr. 16, 2004   (KR) ............... 10-2004-0026201

(51) Int. Cl.
  *G02B 26/08*  (2006.01)
  *G02B 7/182*  (2006.01)
(52) U.S. Cl. .................. 359/216; 359/855
(58) Field of Classification Search ............ 359/212, 359/216–219, 870–872, 197, 383, 350; 106/626; 501/95.1, 99; 428/307.7, 312.6, 325; 350/6.8
See application file for complete search history.

(56) References Cited

U.S. PATENT DOCUMENTS

| | | | | |
|---|---|---|---|---|
| 4,101,365 A | * | 7/1978 | Fisli | 156/294 |
| 4,277,141 A | * | 7/1981 | Kleiber | 359/855 |
| 4,842,354 A | * | 6/1989 | Takahashi et al. | 359/218 |
| 4,993,791 A | | 2/1991 | Burt et al. | 350/6.8 |
| 5,361,170 A | * | 11/1994 | Takeyasu | 359/850 |
| 5,907,430 A | * | 5/1999 | Taylor et al. | 359/350 |
| 7,022,629 B2 | * | 4/2006 | Theriault | 442/349 |

FOREIGN PATENT DOCUMENTS

| | | |
|---|---|---|
| JP | 60-046504 | 3/1985 |
| JP | 01-113718 | 5/1989 |
| JP | 01113718 A * | 5/1989 |
| JP | 02-287420 | 11/1990 |
| JP | 04-313718 | 5/1992 |
| JP | 05-072494 | 3/1993 |
| JP | 05-257077 | 10/1993 |
| JP | 06/110002 | 4/1994 |
| JP | 07-098403 | 4/1995 |
| JP | 08-020075 | 1/1996 |
| JP | 2001-347534 | 12/2001 |
| JP | 2003-149580 | 5/2003 |

* cited by examiner

*Primary Examiner*—Scott J. Sugarman
*Assistant Examiner*—DaWayne A. Pinkney
(74) *Attorney, Agent, or Firm*—Roylance, Abrams, Berdo & Goodman, L.L.P.

(57) ABSTRACT

A polygon mirror structure comprising a mirror body including spherical ceramic particles, a reinforcement member for reinforcing the strength of the ceramic particles, and a polymer, and further comprising a plurality of mirror surfaces formed on a lateral surface of the mirror body, wherein as the mirror body rotates, incident light is deflected and scanned along the mirror body surfaces. The polygon mirror can be manufactured on a large scale simply by plastic molding without having to use high-precision processing. Also, since the polygon mirror includes spherical ceramic particles, it is possible to prevent deformation due to shrinkage of polymer materials after plastic molding. Further, the use of a high-strength reinforcement member increases a tensile strength, thereby enabling the polygon mirror to be efficiently used in high-speed rotation.

29 Claims, 3 Drawing Sheets

POLYGON MIRROR AND OPTICAL SCANNING APPARATUS EMPLOYING THE SAME

CROSS-REFERENCE TO RELATED APPLICATIONS

This application claims the benefit under 35 U.S.C. 119(a) of Korean Patent Application No. 10-2004-0026201 filed in the Korean Intellectual Property Office on Apr. 16, 2004, the entire disclosure of which is incorporated herein by reference.

BACKGROUND OF THE INVENTION

1. Field of the Invention

The present invention relates to a polygon mirror and an optical scanning apparatus employing the same. More particularly, the present invention relates to a polygon mirror that is capable of withstanding a tensile load generated due to a rotational force during high speed rotation, and an optical scanning apparatus employing the same.

2. Description of the Related Art

An optical scanning apparatus, which is commonly employed with an image recording apparatus that prints an image on a sheet of printing paper, such as a copier, printer, facsimile or the like, forms an electrostatic latent image by scanning light beams emitted from a light source, such as a laser diode, onto a photosensitive medium of the image forming apparatus.

FIG. 1 is a perspective view of a general polygon mirror for use in an optical scanning apparatus. Referring to FIG. 1, a polygon mirror 10 includes a mirror body 11 having a plurality of square mirror surfaces 12, and is used as an optical deflector that deflects a light beam to the optical scanning apparatus. The polygon mirror 10 rotates at a constant speed by means of a driver, such as a motor (not shown), during an image forming operation.

The optical scanning apparatus scans the light beam on a scan surface in a scanning direction by rotating the polygon mirror 10, thereby recording an image on a photosensitive drum (not shown).

The polygon mirror 10 is a processed product having sub-micron level precision and reflectivity. Accordingly, control of a manufacturing process of the polygon mirror 10 is quite difficult to achieve and the use of high-purity aluminum makes the process require an extended processing time, resulting in a high manufacturing cost and capital investment for facilities, and difficulties in supplying quantities to meet demands. To overcome such problems, research into methods of manufacturing a polygon mirror by molding the polygon mirror by plastic molding, pressing, or die casting, and performing mirror surface coating on the polygon mirror, has been continuously conducted.

In the case of plastic molding, a deformation due to shrinkage exhibited after the plastic molding makes surface precision of the polygon mirror unsatisfactory. Another approach has been proposed to maintain the configuration of a polygon mirror even with the shrinkage of plastic materials such that a plastic material is mixed with spherical ceramic particles and then molded, as disclosed in Japanese Patent Laid-open Publication No. 01-113718, the entire disclosure of which is hereby incorporated by reference.

However, the use of spherical ceramic particles makes it impossible to withstand a tensile load due to a rotational force exerted during high-speed rotation of approximately 40,000 rpm or higher, even though the dimensional and configuration accuracy requirements can be satisfied. In this case, the polymer material, which mostly serves as a binder, must withstand the tensile load. However, the tensile strength of the polymer material is too low to withstand the tensile load due to a rotational force, thus limiting the application of the polygon mirror on the basis of rotation speed, that is, limiting the application of the polygon mirror to rotation speeds of not greater than 20,000 rpm.

Accordingly, a need exists for a polygon mirror having a durability that is high enough to withstand a tensile load due to a rotational force exerted during high-speed rotation.

SUMMARY OF THE INVENTION

The present invention substantially solves the above and other problems and provides a polygon mirror having a durability that is high enough to withstand a tensile load due to a rotational force exerted during high-speed rotation, and an optical scanning apparatus employing the same.

According to an aspect of the present invention, a polygon mirror structure is provided comprising a mirror body including spherical ceramic particles, a reinforcement member for reinforcing the strength of the ceramic particles, and a polymer. The polygon mirror structure further comprises a plurality of mirror surfaces formed on a lateral surface of the mirror body, wherein as the mirror body rotates, incident light is deflected and scanned throughout the mirror body surfaces.

According to another aspect of the present invention, a polygon mirror structure as described above further comprises a shaft housing for the polygon mirror structure.

According to still another aspect of the present invention, an optical scanning apparatus is provided comprising a light source, the polygon mirror as described above for reflecting the light beam emitted from the light source by rotating via a driving source and for deflecting the same, and an image forming optical system for forming an image on the scan surface by scanning the light beam reflected/deflected by the polygon mirror.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Figure 1:
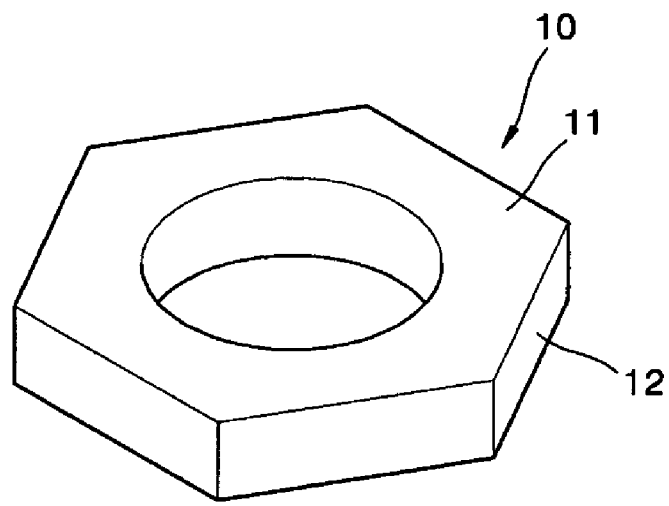
FIG. 1 is a perspective view of a conventional polygon mirror structure.
Figure 2:
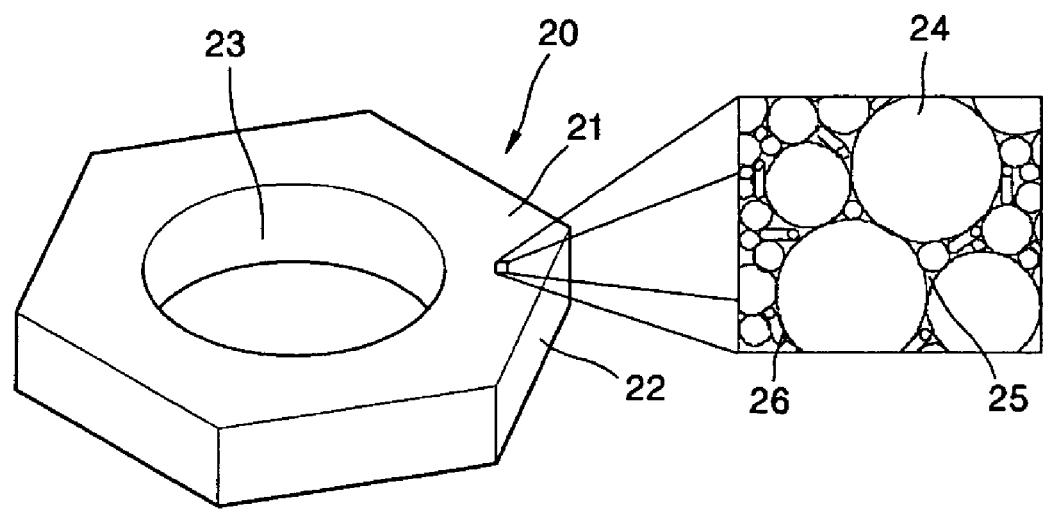
FIG. 2 is a perspective view of a polygon mirror structure according to an embodiment of the present invention.

The present invention will now be described in greater detail. FIG. 2 is a perspective view of a polygon mirror structure according to an embodiment of the present invention and referring thereto, a polygon shaped mirror structure 20 includes a plurality of square mirror surfaces 22, a mirror body 21, and a shaft housing 23 formed at the center of the mirror body 21. The polygon mirror structure 20 is used as an optical deflector for deflecting a light beam to an optical scanning apparatus. The polygon mirror structure 20 rotates at a constant rotation speed by means of a driver, such as a motor (not shown), during an image forming operation.

Referring to FIG. 2, the composition of the polygon mirror 20 structure will now be described. The polygon mirror structure 20 comprises a ceramic-based composite material including spherical ceramic particles 24, a polymer 25, and a high-strength reinforcement member 26 for compensating for the strength of the ceramic particles.

The reinforcement member 26 has a length-to-diameter ratio of not less than approximately 10, specifically from between approximately 10 and approximately 50, which makes the reinforcement member 26, in cooperation with the polymer 25, serve to withstand a tensile load generated due to a rotational force exerted during high-speed rotation of the polygon mirror structure 20. Examples of the reinforcement member 26 include, but are not limited to, fibers, whiskers, and the like, and preferably comprises material which has a thermal expansion or shrinkage that is the same as or similar to that of the spherical ceramic particles 24. However, in order to reduce the density of the material and increase the tensile strength, a carbonaceous material, glass, silica, or alumina may also be selectively used. Examples of the reinforcement member 26 include, but are not limited to, ceramic filaments such as silica, alumina or silicon carbide, and reinforcement filaments such as carbon fibers, or glass fibers. Here, the term "fiber" is used to mean a natural or artificial, line-shaped material, which is long, thin, and bendably soft, and the term "whisker" is used to mean a needle-like crystal.

In the polygon mirror 20, the content of the reinforcement member 26 is preferably in a range of between approximately 0.1 to approximately 5 parts by weight, preferably 0.5 to 2 parts by weight based on 100 parts by weight of the total weight of the polygon mirror composition, that is, the sum of the contents of the spherical ceramic particles 24, the polymer 25 and the reinforcement member 26. If the content of the reinforcement member 26 is less than approximately 0.1 parts by weight, the shortage can create a poor tensile strength. If the content of the reinforcement member 26 is greater than approximately 5 parts by weight, the excess can undesirably create nonuniformity during molding.

To facilitate the mixing and dispersion of the reinforcement member 26 and the spherical ceramic particles 24, the particle size of the reinforcement member 26, which is in the form of, for example, fibers or whiskers, is preferably equal to or smaller than the average particle diameter of the spherical ceramic particles 24, thereby minimizing shrinkage of the spherical ceramic particles 24 and where the polygon mirror is made of a plastic material, enhancing the tensile strength of the polygon mirror by making the plastic polygon mirror withstand a tensile load applied due to a rotational force.

The particle length of the reinforcement member 26 is preferably approximately 10 to approximately 30 times the diameter of the reinforcement member 26, that is, the fibers or whiskers.

The spherical ceramic particles 24 forming the mirror body 21 of the polygon mirror 20 have an average particle diameter of not greater than approximately 50 μm, preferably approximately 5 to approximately 50 μm, and more preferably approximately 15 to approximately 30 μm. If the diameter of the ceramic particles 24 is greater than 50 μm, the polymer material disposed between each of the particles 24 may shrink during molding, thereby undesirably deteriorating the surface roughness of the polymer. If the diameter of the spherical ceramic particles 24 is the same as the average particle diameter, the filling efficiency in a mold for forming the polygon mirror is not sufficiently high. That is, if the ceramic particles 24 having the same particle size are used, spaces between each of the particles are constant, which restricts an increase in the ratio of ceramic particles 24 contained within the material and causes a considerable shrinkage due to an increased amount of polymer filling the spaces between the particles 24 and undesirably increases porosity due to the shrinkage. Therefore, the use of spherical ceramic particles 24 of various particles sizes is preferred. In order to minimize the shrinkage of the polygon mirror 20, it is further preferable to increase the proportion of the spherical ceramic particles 24 contained in the polygon mirror composition. The content of the spherical ceramic particles 24 is in a range of approximately 49 to approximately 92 parts by weight, preferably approximately 75 to approximately 90 parts by weight, and more preferably approximately 85 to approximately 90 parts by weight, based on 100 parts by weight of the total weight of the polygon mirror composition, that is, the sum of contents of the spherical ceramic particles 24, the polymer 25 and the reinforcement member 26.

If the content of the spherical ceramic particles 24 is less than approximately 49 parts by weight, the shrinkage is excessive, which is not suitable for high precision molding. If the content of the spherical ceramic particles 24 is greater than approximately 92 parts by weight, the excess may undesirably result in poor uniformity during material mixing and molding steps.

Examples of the spherical ceramic particles 24 include, but are not limited to, silica ($SiO_2$), alumina ($Al_2O_3$), silicon carbide (SiC), silicon nitride ($Si_3N_4$), and the like. Specifically, silica is most preferred because it is inexpensive and easily available compared to other ceramic particles.

The polymer 25 used in embodiments of the present invention induces a physical bond after mixing the spherical ceramic particles 24 and the reinforcement member 26, of a fiber or whisker type, and examples thereof include, but are not limited to thermoplastic resin and heat-curable resin. Examples of such thermoplastic resin include general-purpose resins exemplified by polyethylene, polypropylene, polyvinylchloride (PVC), polyethyleneterephthalate (PET), polystyrene (PS), acrylonitrile butadiene styrene (ABS), aromatic polyethersulfone (PES), and polyvinyl alcohol (EVA), and engineering-purpose resins exemplified by polymethylmethacrylate (PMMA), polyethyleneterephthalate (PET), polyamide (PA), polycarbonate (PC), polybutyleneterephthalate (PBT), and polyamideimide (PAI). Examples of the heat-curable resin include polyester, epoxy (EP), phenolic resins (PH), polyimide (PI) and the like. In embodiments of the present invention, epoxy resin or acrylic resin is preferably used as the polymer 25.

The content of the polymer 25 is preferably in a range of approximately 7 to approximately 50 parts by weight, and preferably approximately 10 to approximately 15 parts by weight based on 100 parts by weight of the total weight of the polygon mirror composition. If the content of the polymer 25 is less than approximately 8 parts by weight, pores may be generated during molding, and if the content of the polymer 25 is greater than approximately 50 parts by weight, the excess may result in considerable shrinkage after molding.

The polymer 25 employs an appropriate polymer material according to the plastic molding method. A variety of plastic molding methods can be used, including, but not limited to, compression molding, injection molding, resin transfer molding, and so on. Specifically, in order to minimize the shrinkage and to maximize the content of spherical ceramic particles 24 in the mixture, compression molding is preferred in view of the configuration and dimension accuracy provided during molding.

When a large quantity of spherical ceramic particles 24 is used in forming the polygon mirror, shrinkage corresponding to an increase in the thickness of the polygon mirror is generated. Thus, in order to minimize the radial thickness of the polygon mirror, injection molding may be employed.

Figure 3:
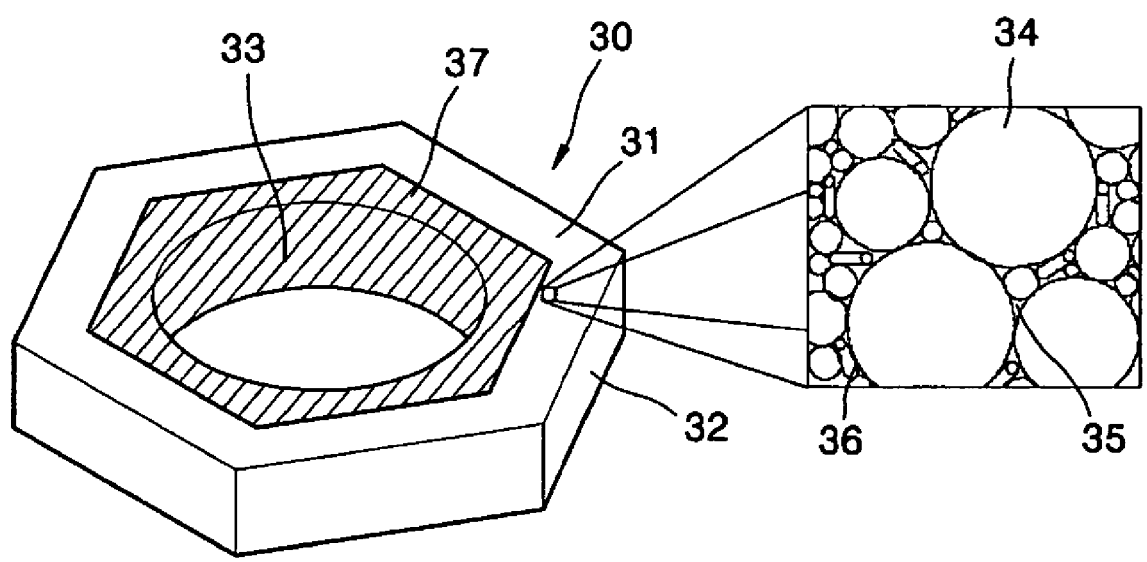
FIG. 3 is a perspective view of a polygon mirror according to another embodiment of the present invention.

In FIG. 3, a polygon mirror 30 according to another embodiment of the present invention is shown, and can be manufactured by a general polygon mirror manufacturing method which will now be described. The polygon mirror 30 can be manufactured by mixing the spherical ceramic particles 34 with the polymer 35 and the reinforcement member 36 for compensating for the strength of the ceramic particles 34, wherein each is comprised substantially as described above, and then molding the resulting mixture.

As shown in FIG. 3, the polygon mirror 30 is fabricated such that an insert part 37 is inserted into a shaft housing 33 disposed at the center of a mirror body 31 having a plurality of square mirror surfaces 32. The insert part 37 serves as a filler and a reference plane for shaft fabrication and mirror fixation, and is made of aluminum or brass.

A reflection layer (not shown) may be further provided on a part of the mirror body 31 of the polygon mirror 30. The reflection layer is formed of a material having high reflectivity, such as aluminum, silver or gold. The reflection layer preferably has a thickness of approximately 1 µm to approximately 10 µm.

In order to increase the adhesion strength between the mirror body 31 and the reflection layer, a ceramic intermediate layer (not shown) made of a ceramic material may be further formed therebetween. Here, in view of the particle size and material composition, the same material as that of the ceramic spherical particles 34 used for the polygon mirror 30 can be used as the ceramic material.

In some cases, prior to forming the reflection layer on the mirror body 31, a photo-curable resin is preferably coated on the mirror body 31 to form an intermediate layer and to increase planarity of the mirror body 31, which is economically beneficial. A UV curable adhesive, such as UV curable epoxy resin, is used as the photo-curable resin.

Figure 4:
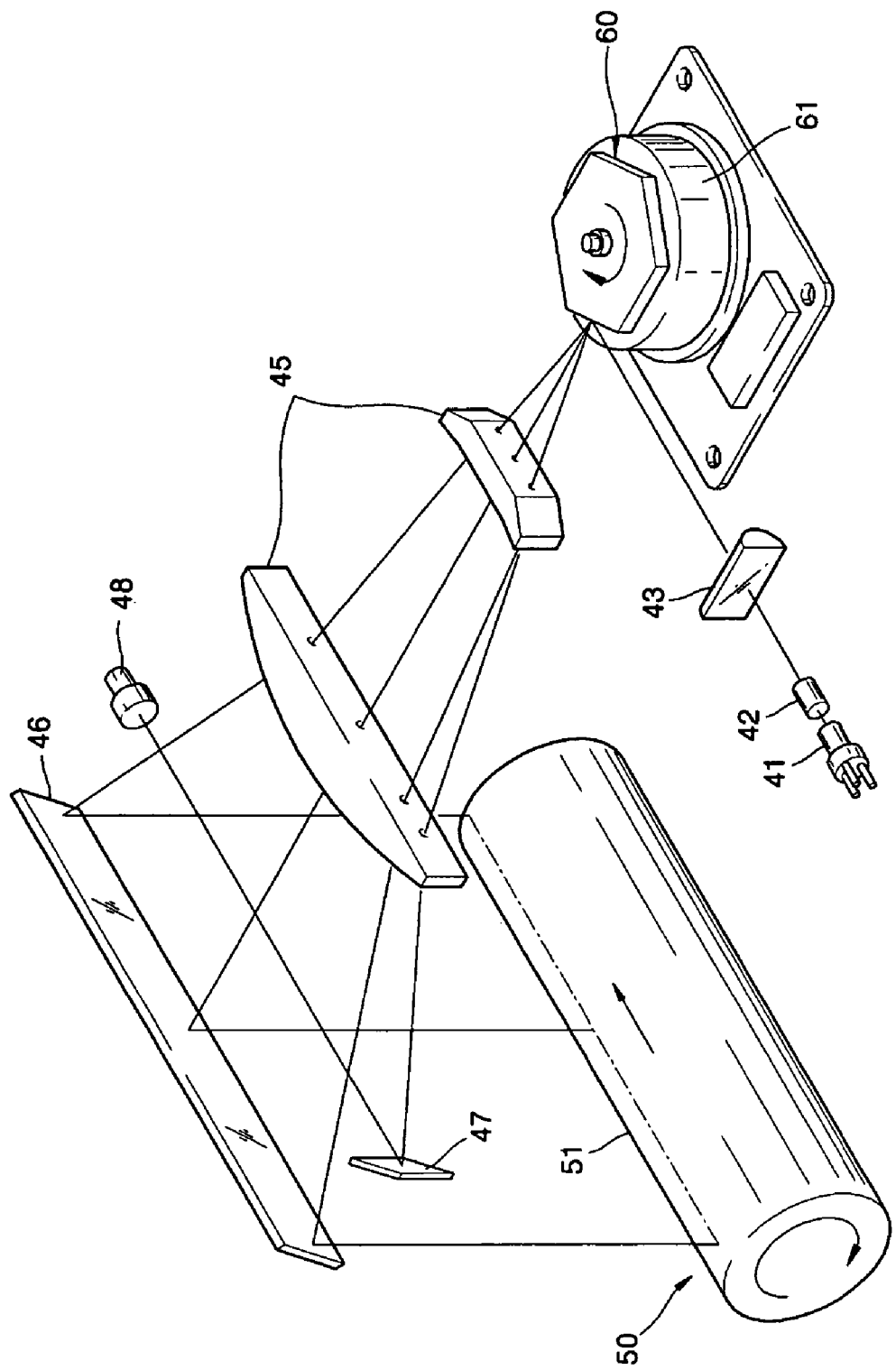
FIG. 4 is a perspective view of an optical scanning apparatus employing a polygon mirror according to an embodiment of the present invention.

FIG. 4 is a perspective view of an optical scanning apparatus employing a polygon mirror according to an embodiment of the present invention.

Referring to FIG. 4, the optical scanning apparatus according to an embodiment of the present invention includes a light source 41, an optical deflector for deflecting a light beam emitted from the light source 41, and a f-θ lens 45 disposed between the optical deflector and a photosensitive medium 50 positioned on a scanned surface. Also, the optical scanning apparatus according to an embodiment of the present invention may further include a collimating lens 42 for converting divergent light emitted from the light source 41 into collimated light, and a cylindrical lens 43 having a predetermined refractive force in a sub-scanning direction only, for linearly focusing the light on a deflected surface of the optical deflector.

The light emitted from the light source 41 is converted into the collimated light by means of the collimating lens 42. The collimated light is incident into the optical deflector via the cylindrical lens 43. A laser diode may be provided as the light source 41 to emit laser beams, however, a variety of other laser devices can be used as the light source 41.

The cylindrical lens 43 has a predetermined refractive force in a sub-scanning direction only, so that the laser beam is made to land on the deflected surface of the optical deflector, that is, substantially linearly on the mirror surface of the polygon mirror 60.

The polygon mirror 60 according to an embodiment of the present invention employs an optical deflector having a plurality of mirror surfaces used as deflected surfaces.

As described above, the polygon mirror 60 includes a mirror body, such as 21 or 31 of FIGS. 2 and 3, respectively, having a plurality of mirror surfaces. The mirror body includes spherical ceramic particles such as 24 and 34, polymer such as 25 and 35, and a reinforcement member such as 26 or 36, and may further include a reflection layer (not shown) on the mirror body.

The polygon mirror 60 rotates at a constant speed by means of a driving motor 61 during an image forming operation. The polygon mirror 60 may further include a rotor frame (not shown) that is rotated by a stator of the driving motor 61. Also, a rotating part in an assembly of the polygon mirror 60 and the driving motor 61, that is, a rotor, can include a rotor frame (not shown) that is coupled to a rotation shaft of the driving motor 61 so that the polygon mirror 60 can be inserted into the rotor frame, a mirror housing for fixing the polygon mirror 60 can be mounted on the rotor frame, a rotor housing can be coupled to the rotor frame, and a magnet can be installed on the internal surface of the rotor housing.

The f-θ lens 45, which is an image forming optical system, is disposed between the polygon mirror 60 and a photosensitive medium 50, such as a photosensitive drum. The f-θ lens 45 has different refractive forces in main and sub-scanning directions, and induces the laser beam deflected/reflected from the mirror surfaces of the polygon mirror 60 onto a photosensitive medium surface 51.

A reflecting mirror 46 may further be provided on the optical path between the f-θ lens 45 and the photosensitive medium 50, allowing the light having passed through the f-θ lens 45 to then be reflected to travel toward the photosensitive medium surface 51. Also, the optical scanning apparatus according to an embodiment of the present invention may further include a reflecting mirror 47 that partially reflects the light having passed through the f-θ lens 45, and an optical sensor 48 that receives the light reflected from the reflecting mirror 47 and tunes horizontal synchronization for detecting optical scanning by scan lines.

The optical scanning apparatus scans a light beam on the photosensitive medium surface 51 in a scanning direction by rotating the polygon mirror 60, thereby performing image recording on the photosensitive medium 50.

An exemplary configuration of an embodiment of the present invention incorporating at least some of the above elements will now be described with reference to the following Examples, but the invention is not limited thereto.

EXAMPLE 1

Example 1 includes a polygon mirror structure such as 20 and 30 of FIGS. 2 and 3, respectively, comprising approximately 84 parts by weight of $SiO_2$ having an average particle diameter of approximately 20 µm to approximately 30 µm, approximately 1 part by weight of silica ceramic reinforcement filament, and approximately 15 parts by weight of epoxy resin that were mixed, and the mixture was subjected to pressing molding, thereby manufacturing a polygon mirror.

COMPARATIVE EXAMPLE 1

In the Comparative Example 1, a polygon mirror was manufactured by the same method as in Example 1 except that only spherical ceramic particles, such as 24 and 34, were used.

Images were then recorded on the photosensitive medium by the optical scanning apparatus shown in FIG. 4 using the polygon mirrors manufactured in Example 1 and Comparative Example 1.

As a result, it was confirmed that the polygon mirror manufactured in Example 1 could withstand a tensile load generated during high-speed rotation better than the polygon mirror manufactured in Comparative Example 1.

Also, a simple tensile strength test showed that the polygon mirror reinforced with reinforcement filaments (as in Example 1) had an approximately 10~20% higher tensile strength than the polygon mirror without reinforcement filaments. Rotation tests of the polygon mirror structures with and without reinforcement filaments, that is, as in Example 1 and Comparative Example 1, were performed in a high-temperature (approximately 80° C.) chamber for 1000 hours. According to the rotation tests, polygon mirror samples reinforced with the reinforcement filaments maintained a stable configuration even at a high rotation speed of not less than 30,000 rpm. That is, substantially no samples showed a change in the measured data with respect to the configuration before and after the tests. However, some samples without reinforcement filaments showed a deviation from an acceptable range of change in the measured data at 30,000 rpm or higher.

The polygon mirror according to the present invention can be manufactured on a large scale simply by plastic molding, without having to use high-precision processing. Also, since the polygon mirror includes spherical ceramic particles, it is possible to prevent deformation due to shrinkage of polymer materials after plastic molding, which may make it difficult to achieve dimension and configuration accuracy. Further, the use of a high-strength reinforcement member for compensating for the strength of the spherical ceramic particles increases a tensile load due to a rotational force exerted during high-speed rotation, thereby enabling the polygon mirror to be efficiently used in high-speed rotation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polygon mirror structure, comprising:
   a mirror body including spherical ceramic particles, a reinforcement member for reinforcing the strength of the ceramic particles, and polymer; and
   a plurality of mirror surfaces formed on a lateral surface of the mirror body, wherein as the mirror body rotates, incident light is deflected and scanned throughout the mirror body surfaces;
   wherein the reinforcement member is approximately 5 parts by weight or less based on 100 parts by weight of the total weight of the mirror body.

2. The polygon mirror structure of claim 1, wherein the reinforcement member comprises at least one of a fiber or a whisker.

3. The polygon mirror structure of claim 1, wherein the reinforcement member comprises a ceramic filament.

4. The polygon mirror structure of claim 3, wherein said ceramic filament is made of a material which is substantially the same as or similar to that of the spherical ceramic particles.

5. The polygon mirror structure of claim 1, wherein the reinforcement member comprises at least one compound selected from the group consisting of silica ($SiO_2$), alumina ($Al_2O_3$), silicon carbide (SiC), silicon nitride ($Si_3N_4$), a carbonaceous material, and glass.

6. The polygon mirror structure of claim 1, wherein the reinforcement member has a length-to-diameter ratio of not less than approximately 10.

7. The polygon mirror structure of claim 1, wherein the spherical ceramic particles have an average particle diameter of approximately 50 µm or less; and
   the spherical ceramic particles comprise at least one compound selected from the group consisting of silica ($SiO_2$), alumina ($Al_2O_3$), silicon carbide (SiC), and silicon nitride ($Si_3N_4$).

8. The polygon mirror structure of claim 1, wherein the polymer comprises at least one material selected from the group consisting of epoxy resins and acrylic resins.

9. The polygon mirror of claim 1, wherein said mirror body includes the reinforcement member in an amount of approximately 0.1 to approximately 5 parts by weight based on 100 parts by weight of the total weight of the mirror body.

10. The polygon mirror structure of claim 1, further comprising a reflection layer disposed on the mirror body.

11. The polygon mirror structure of claim 10, wherein the reflection layer includes at least one material selected from the group consisting of aluminum, silver and gold.

12. The polygon mirror structure of claim 1, further comprising an intermediate layer including at least one material selected from the group consisting of a photocurable resin and a ceramic material, wherein the intermediate layer is disposed between the mirror body and the reflection layer.

13. The polygon mirror structure of claim 1, wherein said reinforcement members are carbon fibers.

14. The polygon mirror structure of claim 1, wherein said mirror body includes about 49 to 92 parts by weight of said spherical ceramic particles, and about 0.1 to 5 parts by weight of said reinforcement member, where said parts by weight are based on 100 parts by weight of said mirror body.

15. A polygon mirror, comprising:
    the polygon mirror structure comprising a mirror body including spherical ceramic particles, a reinforcement member for reinforcing the strength of the ceramic particles, and polymer; and a plurality of mirror surfaces formed on a lateral surface of the mirror body, wherein as the mirror body rotates, incident light is deflected and scanned throughout the mirror body surfaces; and
    a shaft housing of the polygon mirror structure;
    wherein the reinforcement member is approximately 5 parts by weight or less based on 100 parts by weight of the total weight of the mirror body.

16. The polygon mirror of claim 15, wherein the reinforcement member comprises at least one of a fiber or a whisker.

17. The polygon mirror of claim 15, wherein the reinforcement member comprises a ceramic filament.

18. The polygon mirror of claim 17, wherein said ceramic filament is made of a material which is substantially the same as or similar to that of the spherical ceramic particles.

19. The polygon mirror of claim 15, wherein the reinforcement member comprises at least one compound selected from the group consisting of silica (SiO$_2$), alumina (Al$_2$O$_3$), silicon carbide (SiC), silicon nitride (Si$_3$N$_4$), a carbonaceous material, and glass.

20. The polygon mirror of claim 15, wherein the reinforcement member has a length-to-diameter ratio of not less than approximately 10.

21. The polygon mirror of claim 15, wherein the spherical ceramic particles have an average particle diameter of approximately 50 μm or less; and the spherical ceramic particles comprise at least one material selected from the group consisting of silica (SiO$_2$), alumina (Al$_2$O$_3$), silicon carbide (SiC), and silicon nitride (Si$_3$N$_4$).

22. The polygon mirror of claim 15, wherein the polymer comprises at least one material selected from the group consisting of epoxy resins and acrylic resins.

23. The polygon mirror of claim 15, wherein said mirror body includes the reinforcement member in an amount of approximately 0.1 to approximately 5 parts by weight based on 100 parts by weight of the total weight of the mirror body.

24. The polygon mirror of claim 15, further comprising a reflection layer disposed on the mirror body.

25. The polygon mirror of claim 24, wherein the reflection layer includes at least one material selected from the group consisting of aluminum, silver and gold.

26. The polygon mirror of claim 15, further comprising an intermediate layer including at least one material selected from the group consisting of photo-curable resin and ceramic, wherein the intermediate layer is disposed between the mirror body and the reflection layer.

27. The polygon mirror structure of claim 15, wherein said reinforcement members are carbon fibers.

28. The polygon mirror structure of claim 15, wherein said mirror body includes about 49 to 92 parts by weight of said spherical ceramic particles, and about 0.1 to 5 parts by weight of said reinforcement member, where said parts by weight are based on 100 parts by weight of said mirror body.

29. An optical scanning apparatus comprising:

a light source for emitting a light beam;

a polygon mirror for reflecting the light beam emitted from the light source and deflecting the same, wherein the polygon mirror is rotated by a driving source; and an image forming optical system for forming an image on a scanned surface by scanning the light beam reflected and deflected by the polygon mirror;

wherein the polygon mirror includes a polygon mirror structure comprising a mirror body formed from a composition including spherical ceramic particles, a reinforcement member for reinforcing the strength of the ceramic particles, and a polymer, wherein the reinforcement member is approximately 5 parts by weight or less based on 100 parts by weight of the total weight of the mirror body;

a plurality of mirror surfaces formed on a lateral surface of the mirror body, wherein as the mirror body rotates, incident light is deflected and scanned throughout the mirror body surfaces; and a shaft housing disposed upon the polygon mirror structure.

* * * * *